United States Patent
Gates

(10) Patent No.: US 9,330,376 B2
(45) Date of Patent: May 3, 2016

(54) SYSTEM AND METHOD FOR ASSIGNING A BUSINESS VALUE RATING TO DOCUMENTS IN AN ENTERPRISE

(75) Inventor: Carrie E. Gates, New York, NY (US)

(73) Assignee: CA, Inc., New York, NY (US)

( * ) Notice: Subject to any disclaimer, the term of this patent is extended or adjusted under 35 U.S.C. 154(b) by 908 days.

(21) Appl. No.: 12/814,842

(22) Filed: Jun. 14, 2010

(65) Prior Publication Data

US 2011/0307408 A1   Dec. 15, 2011

(51) Int. Cl.
*G06F 17/30* (2006.01)
*G06Q 10/10* (2012.01)
*G06Q 50/18* (2012.01)

(52) U.S. Cl.
CPC .............. *G06Q 10/10* (2013.01); *G06Q 50/18* (2013.01); *G06Q 50/184* (2013.01)

(58) Field of Classification Search
CPC ... G06F 17/30598; G06F 21/00; G06F 21/10; G06F 21/31; G06F 21/33; G06F 17/30011; G06F 17/30722; G06F 17/30864; G06F 17/30867; G06F 2201/87; G06F 21/6218; G06F 2221/2141
See application file for complete search history.

(56) References Cited

U.S. PATENT DOCUMENTS

| | | | | |
|---|---|---|---|---|
| 7,454,742 B2 * | 11/2008 | Nelson | | 717/104 |
| 7,860,933 B2 * | 12/2010 | Kussmaul et al. | | 709/206 |
| 2003/0046639 A1 * | 3/2003 | Fai et al. | | 715/513 |
| 2003/0135818 A1 * | 7/2003 | Goodwin | G06F 17/30616 | 715/205 |
| 2004/0111478 A1 * | 6/2004 | Gross et al. | | 709/206 |
| 2006/0010086 A1 * | 1/2006 | Klein | | 705/410 |
| 2007/0067397 A1 * | 3/2007 | Tran | | 709/206 |
| 2007/0088676 A1 * | 4/2007 | Rail | | 707/3 |
| 2007/0100857 A1 * | 5/2007 | DeGrande et al. | | 707/101 |
| 2007/0191035 A1 * | 8/2007 | Huggett | | 455/466 |
| 2008/0040457 A1 * | 2/2008 | Nygard | | 709/220 |
| 2008/0104052 A1 * | 5/2008 | Ryan | G06F 17/2745 | |
| 2008/0288330 A1 * | 11/2008 | Hildebrand | G06Q 10/06 | 705/7.28 |
| 2009/0132345 A1 * | 5/2009 | Meyssami | G06Q 10/10 | 705/7.33 |
| 2009/0147940 A1 * | 6/2009 | Graves et al. | | 379/208.01 |
| 2009/0234815 A1 * | 9/2009 | Boerries | G06F 17/30867 | |
| 2009/0293121 A1 * | 11/2009 | Bigus | G06F 21/316 | 726/22 |
| 2010/0070510 A1 * | 3/2010 | Agarwal et al. | | 707/748 |
| 2010/0131523 A1 * | 5/2010 | Yu et al. | | 707/756 |
| 2010/0153388 A1 * | 6/2010 | Gollapudi et al. | | 707/736 |
| 2010/0191952 A1 * | 7/2010 | Keinan | G06Q 10/06 | 713/100 |
| 2011/0208663 A1 * | 8/2011 | Kennis et al. | | 705/317 |
| 2011/0270845 A1 * | 11/2011 | Lin et al. | | 707/748 |

* cited by examiner

*Primary Examiner* — Angelica Ruiz
(74) *Attorney, Agent, or Firm* — Baker Botts L.L.P.

(57) ABSTRACT

A system and method for managing information in an enterprise is disclosed. In one embodiment, the method comprises receiving a document from a component of an enterprise network, determining one or more characteristics associated with the document, assigning a priority score to a user associated with the document, assigning a business value rating to the document, and performing an operation with the document based on the business value rating. In another embodiment, the system includes a processor operable to receive a document, determine one or more characteristics associated with the document, determine a priority score to a user associated with the document, assign a business value rating to the document, and perform an operation with the document based on the business value rating.

17 Claims, 2 Drawing Sheets

SYSTEM AND METHOD FOR ASSIGNING A BUSINESS VALUE RATING TO DOCUMENTS IN AN ENTERPRISE

TECHNICAL FIELD OF THE INVENTION

This disclosure relates generally to information managements systems, and more particularly to a system and method for assigning a business value rating to documents in an enterprise.

BACKGROUND OF THE INVENTION

Corporations typically create and store large volumes of information that might be valuable to the enterprise, containing confidential information or intellectual property. Examples of such information might include emails between senior executives regarding an upcoming acquisition, invention disclosures submitted to legal counsel for review, draft versions of quarterly financial results being developed for release to shareholders, and corporate strategy documents.

Data leak prevention (DLP) technologies have been developed to help protect information from public release. For example, such technologies will monitor the traffic flowing through the border of a network looking for key expressions. Further, DLP has also focused primarily on personally identifiable information due to the compliance requirements surrounding such information. Apart from this, many system require administrators to provide tags, or specific keywords, for which the DLP engine will search.

SUMMARY OF THE INVENTION

The present disclosure provides a system and method for managing information in an enterprise that substantially eliminates or reduces at least some of the disadvantages and problems associated with previous methods and systems for managing information in an enterprise.

In accordance with one embodiment of the present invention, a method for managing information in an enterprise includes receiving a document from a component of an enterprise network, wherein the enterprise network comprises a plurality of heterogeneous data servers and a plurality of clients. The method further includes determining, with a processor, one or more characteristics associated with the document, wherein the one or more characteristics are selected from the group comprising a creator of the document, a sender of the document, a receiver of the document, and a quantity of recipients of the document. Additionally, the method includes assigning, with the processor, a priority score to a user associated with the document. The method also includes assigning, with the processor, a business value rating to the document based, at least in part, on the one or more characteristics and the priority score. Further, the method includes performing an operation with the document based on the business value rating.

In accordance with another embodiment of the present invention, a system for managing information in an enterprise includes a plurality of heterogeneous data servers and a plurality of clients in communication with at least one of the plurality of heterogeneous data servers. The system also includes a processor operable to receive a document from at least one of one of the plurality of heterogeneous data servers and one of the plurality of clients and determine one or more characteristics associated with the document. The characteristics are selected from the group comprising a creator of the document, a sender of the document, a receiver of the document, and a quantity of recipients of the document. The process is further operable to assign priority score to a user associated with the document and assign a business value rating to the document based, at least in part, on the one or more characteristics and the priority score. The process is also operable to perform an operation with the document based on the business value rating.

Technical advantages of certain aspects of the present disclosure include efficiently managing documents associated with heterogeneous data servers and clients within an enterprise based on a determined business value. This allows administrators to protect information that is of greatest business value to the enterprise and expend less effort on information that is of lesser business value. This may reduce the manpower required to staff information protection and analysis operations within an enterprise. Additionally, certain components of the present disclosure may analyze and process documents from various heterogeneous data servers. This may reduce substantially the amount and type of computer processing resources required to protect and analyze information within an enterprise. Moreover, a particular embodiment of the present disclosure may perform different operations with respect to documents with different business value ratings. Selectively performing operations on documents with particular business value ratings may reduce the amount of computer processing resources which would be required to examine all information and documents equally. Additionally, certain aspects of the present disclosure may be configured according to the particular needs and capabilities of a particular enterprise. The particular customization allowed by the present disclosure enables administrators to flexibly and efficiently manage information within an enterprise. Other technical advantages of the present disclosure will be readily apparent to one skilled in the art from the following figures, description, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE INVENTION

Figure 1:
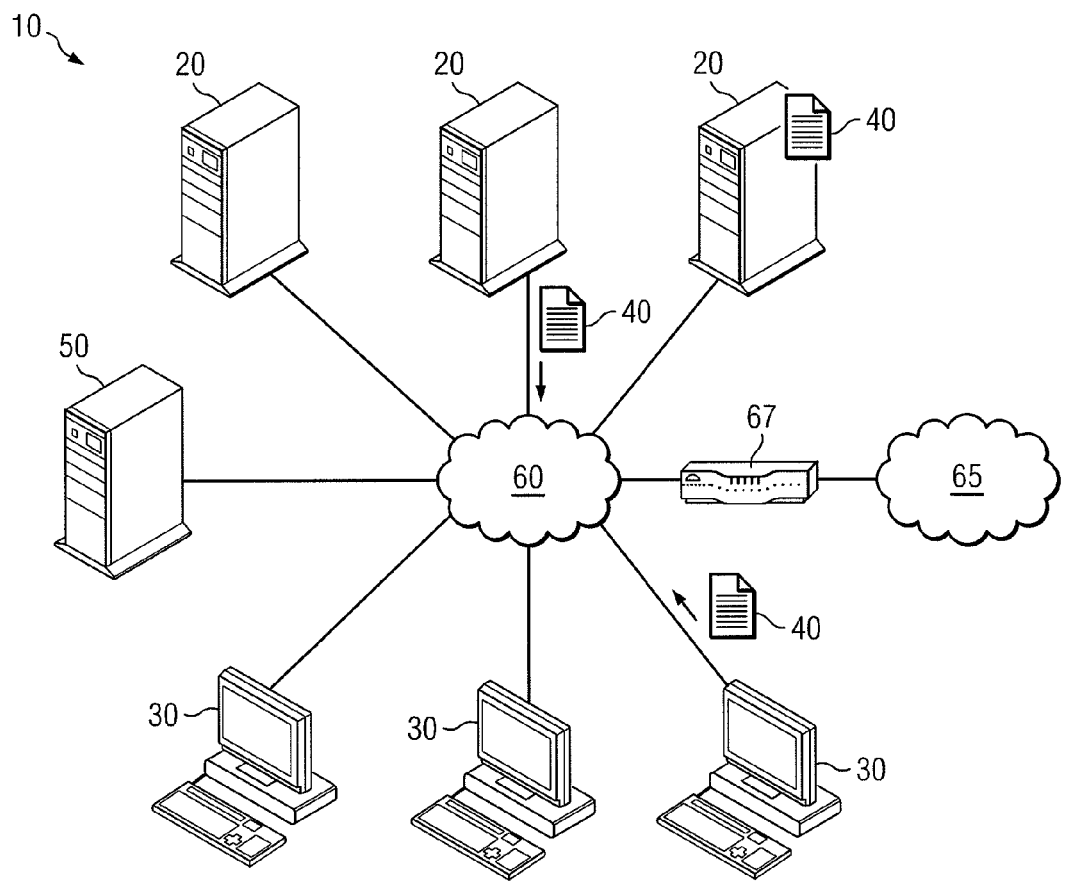
FIG. 1 illustrates an information management system, including clients, heterogeneous data servers, a document processing server, an enterprise network and an external network.

FIG. 1 illustrates a particular embodiment of information management system 10. Information management system 10 includes data servers 20, clients 30, document processing server 50, document 40, and enterprise network 60. Collectively, data servers 20, clients 30, document 40, document processing server 50, and enterprise network 60 may comprise an enterprise. To manage documents and information within an enterprise, document processing server 50 may receive document 40 from one or more clients 30, one or more data servers 20, or may intercept document 40 as document 40 is traversing network. Additionally, document processing server 50 may analyze the contents of document 40 and characteristics associated with document 40, and assign a business value rating to document 40. Additionally, in particular embodiments, document processing server 50 may perform operations on or with documents 40 based on the assigned business value rating.

Data servers 20 (which may be referred to individually as "data server 20" or collectively as "data servers 20") may store, transmit, and/or receive document 40. Data server 20 may represent laptops, workstations, stand-alone servers, blade servers, or cooperative server clusters suitable to perform the described functionality. Additionally, one or more particular data servers 20 may be heterogeneous with respect to other particular data servers 20. For purposes of this description, "heterogeneous" may refer to data servers 20 that communicate in different protocols, are implemented on different hardware platforms, implement different operating systems, perform different functions within an enterprise, or any combination thereof. For example, in particular embodiments of information management system 10, a particular data server 20 may represent a Microsoft Exchange email server, a Unix-based server running a sendmail application, a Microsoft Sharepoint server, a document management system implementing a proprietary document management system protocol, a relational database server implementing Sequence Query Language (SQL), or a general-purpose computer communicating with a remote data storage device via a Network File System (NFS) or Sever Message Block (SMB)/Common Internet File System (CIFS) protocol. Thus, a particular data server 20 that is a Microsoft Exchange email server running on a Microsoft Windows operating system is heterogeneous with respect to data server 20 that is a Unix-based server running a sendmail application. A data server 20 that is a Microsoft Exchange server communicating with enterprise network 60 via TCP/IP is also heterogeneous with respect to a Microsoft exchange server communicating with enterprise network 60 via TokenRing. Although specific examples have been identified, data server 20 may in general represent any combination of computer hardware, software, and/or communications protocols for storing, managing or processing documents 40. Additionally, in some embodiments of information management system 10, data server 20 may represent a plurality of separate components distributed throughout information management system 10, which cooperatively perform the described functions. Furthermore, data servers 20 may be connected to or communicate with other elements of information management system 10 over enterprise network 60, including clients 30, other particular data servers 20, and/or document processing server 50. In general, data servers 20 may represent any appropriate combination of heterogeneous computers suitable to perform the described functions.

Clients 30 (which may be referred to individually as "client 30" or collectively as clients 30) may generate, transmit, receive and/or access document 40. In particular embodiments, clients 30 transmit document 40 to data server 20, receive document 40 from data server 20, and/or access document 40 on data server 20. In particular embodiments, clients 30 represent general or special-purpose computers operating software applications capable of performing the above-described operations on or with document 40. For example, clients 30 may include, but are not limited to, laptop computers, desktop computers, portable data assistants (PDAs), and/or portable media players. Additionally, in particular embodiments, client 30 may include one or more processors operable to execute computer logic and/or software encoded on tangible media that performs the described functionality. Client 30 may also include one or more computer input devices, such as a keyboard, trackball, or a mouse, and/or one or more Graphical User Interfaces (GUIs), through which a user may interact with the logic executing on the processor of client 30. In general, however, client 30 may include any appropriate combination of hardware, software, and/or encoded logic suitable to perform the described functionality. Additionally, clients 30 may be connected to or communicate with data servers 20 and/or document processing server 50 directly or indirectly over enterprise network 60. Clients 30 may couple to enterprise network 60 through a dedicated wired or wireless connection, or may connect to enterprise network 60 only as needed to receive, transmit, or otherwise process document 40. For example, certain types of client 30, such as a portable electronic device, may connect temporarily to enterprise network 60 to transmit or access document 40, and then disconnect after document 40 is transmitted or accessed. Although FIG. 1 illustrates, for purposes of example, a particular number and type of clients 30, alternative embodiments of system 10 may include any appropriate number and type of clients 30, depending on the size of a particular enterprise.

Document 40 represents an electronic file or store of electronic information. Document 40 may be generated by client 30 or data server 20. Examples of documents 40 include, but are not limited to a Microsoft Word document, a Corel Word Perfect document, a Portable Document Format (PDF) document, a Microsoft Exchange email message, a Simple Mail Transfer Protocol email message, a SMS text message, and/or any other electronic computer file, collection of digital information, electronically stored data, and/or any other appropriate electronic representation of words, photos, sounds, or combination thereof. Additionally, document 40 may be electronically stored on data server 20, client 30, or other computer storage component accessible by data server 20 and/or client 30 over enterprise network 60. In particular embodiments, document 40 may be accessed by client 30 on data server 20, transmitted from client 30 to data server 20, transmitted from a particular client 30 to another particular client 30, transmitted from data server 20 to client 30, or transmitted from a particular client 30 to other components of information management system 10. In general, document 40 may traverse or be communicated between or among (e.g. shared by) any appropriate components of information management system 10 in any form or manner.

Additionally, document 40 may include or contain data representing characteristics associated with document 40. Depending on the particular type of document 40, the characteristics may represent types of metadata included with document 40, or other information pertaining to or associated with document 40 not included as metadata. For example, document 40 may represent a Microsoft Word document that includes as a characteristic a creator of document 40. As another example, document 40 may represent an email message that includes as a characteristic the sender of document 40. Document 40 may also represent an email message that includes as a characteristic a recipient or recipients of document 40. Document 40 may additionally represent a secured or encrypted document 40, that has as a characteristic a particular encryption level used to encrypt document 40. Additionally, as discussed further below, a characteristic associated with document 40 may include one or more priority scores associated with a creator, sender, and/or recipient of document 40. Other characteristics may include a number of recipients of document 40, an age since creation, storage, or last transmittal, reception or access of document 40, a filename or title of document 40, and/or a type of document 40.

As discussed further below, depending on the type of document 40, particular characteristics of document 40 may be included in metadata associated with document 40, tags that are assigned manually or automatically, and/or may be determined by document processing server 50 based on other information associated with document 40.

Document processing server 50 analyzes the contents and/or associated characteristics of document 40, determines a priority score of a user associated with document 40, assigns a business value rating to document 40, and/or may perform an operation on or with document 40 based on the business value rating. Additionally document processing server 50 may be capable of receiving, analyzing and/or assigning a business value rating to a plurality of documents 40 received from each of the heterogeneous data servers 20 and/or clients 30. For purposes of this description and of the claims that follow, "priority score" may refer to a number or value assigned to a particular user or users within an enterprise. In particular embodiments, "priority score" may represent the degree to which an administrator seeks to monitor, safeguard, log, or prevent communications from a particular user, and may also represent a risk that a particular user poses to an enterprise. For purposes of this description and of the claims that follow, "business value rating" may refer to a number or qualitative value assigned to a particular document 40. In particular embodiments, the business value rating may represent the business value a particular document 40 has to an enterprise. Business value may represent a degree to which information contained in a particular document 40 may have a financial, legal, or intangible impact on an enterprise. As representative examples, particular documents 40 with a business value to an enterprise may include emails between senior executives regarding an upcoming acquisition, invention disclosures submitted to legal counsel for review, draft versions of quarterly financial results being developed for release to shareholders, and corporate strategy documents. An administrator or user within an enterprise may perform certain operations with respect to particular document 40, depending on the relative business value rating of the relevant document 40.

In particular embodiments, document processing server 50 may represent a server, laptop, workstation, blade servers operating in a server chassis, and/or one or more cooperative server clusters. Additionally, document processing server 50 may represent software executing on other components of information management system 10. For example, document processing server 50 may represent software executing on one or more components of enterprise network 60, including, but not limited to, routers, switches, content switches, and/or firewalls. Document processing server 50 may also represent software executing on one or more data servers 20. Additionally, document processing server 50 may communicate with or connect to other relevant components of information management system 10 over enterprise network 60. As a result, document processing server 50 may receive document 40 transmitted by client 30 and/or accessed by client 30 on data server 20 as document 40 is communicated entirely within enterprise network 60. Additionally, as discussed further below, document server 50 may also receive document 40 as document 40 is received from or transmitted to external network 65. Although shown for purposes of illustration a single document processing server 50, particular embodiments of information management system 10 may include any appropriate number of document processing servers 50 operating in any suitable arrangement within information management system 10.

Enterprise network 60 represents any form of communication network supporting circuit-switched, packet-based, and/or any other suitable type of communication. Enterprise network 60 may additionally include any other components of information management system 10 capable of transmitting and/or receiving information over a communication network, including data server 20 and clients 30. Although shown in FIG. 1 as a single element, enterprise network 60 may represent one or more separate networks including all or parts of various different networks that are separated and serve different respective data servers 20 and/or document processing servers 20. Enterprise network 60 may include routers, hubs, switches, firewalls, content switches, gateways, call controllers and/or any other suitable components in any suitable form or arrangement. Additionally, as described further below, one or more elements of enterprise network 60 may couple to and communicate with external network 65. Enterprise network 60 may also include, in whole or in part, one or more secured and/or encrypted Virtual Private Networks (VPNs) operable to couple one or more elements of enterprise network 60 together by operating or communicating over external network 65. In general, enterprise network 60 may comprise any combination of public or private communication equipment such as elements of the public switched telephone network (PSTN), a global computer network such as the Internet, a local area network (LAN), a wide area network (WAN), or other appropriate communication equipment.

External network 65 represents any form of communication network external to an enterprise. For purposes of this description, "external" may signify a communication network owned, operated or serviced by a party other than the enterprise itself (e.g., an Internet Service Provider). In particular embodiments, external network 65 may couple to enterprise network 60 at communication border device 67. Communication border device 67 may represent a device or service owned or operated by either an enterprise or a third party that, through one or more physical or virtual interfaces, couples enterprise network 60 to external network 65. Communication border device 67 may couple enterprise network 60 to external network 65 by passing data, with or without additional processing, between one or more interfaces coupled to external network 65 to one or more interfaces coupled to enterprise network 60. Examples of communication border device 67 include, but are not limited to, routers, gateways, switches and/or any other peripheral communication devices. In particular embodiments, document 40 may be received from or transmitted to external network through communication border device 67. Additionally, although illustrated for purposes of example an particular embodiment that includes a single external network 65 coupled to a single communication border device 67, other embodiments of information management system 10 may include any appropriate number and type of external networks 65 (whether owned, operated, or serviced by the same third party or multiple third parties) and communication border devices 67. In general, external network 65 may comprise any combination of public or private communication equipment such as elements of the public switched telephone network (PSTN), a global computer network such as the Internet, a wide area network (WAN), or other appropriate communication equipment.

In operation, information management system 10 analyzes document 40 and assigns a business value rating to document 40. In particular embodiments of information management system 10, document 40 may be transmitted through or accessed across enterprise network 60. In other embodiments of information management system 10, document 40 may be transmitted through border device 67 to or from external network 65. Thus, document processing server 50 may receive document 40 transmitted by client 30 and/or accessed by client 30 on data server 20 as document 40 is communicated entirely within enterprise network 60, or as document 40 is communicated to or from external network 65. Document processing server 50 may analyze the contents and/or associated characteristics of document 40, assign a business value rating to document 40, and/or perform additional operations with respect to document 40. By analyzing the contents and/or associated characteristics of document 40 as document 40 is traversing enterprise network 60, being transmitted to external network 65, or otherwise being accessed or utilized, information management system 10 enables administrators to efficiently protect or secure information that has business value to an enterprise, and may prevent information that has a business value from being transmitted to external network 65, or otherwise outside of the enterprise.

An example of this process, as implemented by a particular embodiment of information management system 10, is illustrated in FIG. 1. Although one particular example operation is described with respect to FIG. 1, the following description does not limit the capabilities and/or operation of information management system 10. As shown in FIG. 1, client 30 transmits document to another client 30. In this example, a particular client 30 transmits document 40, which in this example represents an email message, using Microsoft Exchange to another particular client 30. As noted above, client 30 may transmit document 40 to another client 30 through enterprise network 60 or in any other appropriate manner.

After client 30 transmits document 40, document processing server 50 receives document 40. In particular embodiments, document processing server 50 may be appropriately placed within information management system 10 so as to intercept document 40 as it traverses enterprise network 60. In other embodiments, depending on the capabilities and configuration of data server 20 and/or client 30, the relevant component may transmit document 40 to document processing server 50 upon receiving document 40. As a result, document processing server 50 may receive document 40 as it traverses enterprise network 60, or may receive document 40 from one or more data servers 20 or clients 30.

After document processing server 50 receives document 40 from either client 30 or data server 20, document processing server 50 may assign a business value rating to document 40 based on one or more factors, including the contents of document 40, one or more characteristics associated with document 40, or a priority score of a user associated with document 40. For example, document processing server 50 may determine one or more characteristics associated with document 40. In particular embodiments, the characteristics may include, but are not limited to, a sender of the document, a recipient of the document, a quantity of recipients of the document, an age of the document, a size of the document, a name of the document, a type of document, and an encryption level of the document. As noted above, the one or more characteristics may be included in document 40 itself as metadata. The one or more characteristics may also be determined by document processing server 50 independent of any metadata included in document 40.

Additionally, document processing server 50 may analyze the contents of document 40. Document processing server 50 may be configured to electronically search document 40 for keywords, names, addresses, or any other relevant search terms or phrases. For example, document processing server 50 may be configured to search for the name and/or address of a key competitor to determine if an employee is discussing with another employee the possibility of working for the competitor. Document processing server 50 may also be configured to search for keywords, such as "bomb," "explosion," "kill," or any other potentially threatening words. Additionally, document processing server 50 may assign an appropriate business value rating to document 40 based on the contents.

As mentioned above, document processing server 50 may be configured to assign a priority score to a user within information management system 10, and assign a business value rating to a particular document 40 based, at least in part, on a priority score. In particular embodiments, the priority score may be predetermined based on a user's role within the enterprise. Higher-ranked users within an enterprise may receive lower priority scores than lower-ranked users. For example, a CEO of the enterprise may be assigned a priority score of 0, an executive-level role may be assigned a priority score of 2, and a vice president within the enterprise may be assigned a priority score of 3. In a government context, a director may be assigned a priority score of 0, an assistant director a priority score of 2, and a manager a priority score of 3. In other particular embodiments of information management system 10, document processing server 50 may be configured to assign a higher priority score to higher-ranked users, and lower priority scores to lower-ranked users. In general, however, the values assigned to priority scores may be preconfigured and adjustable by an administrator or manager according to the needs and capabilities of an enterprise, and the number and types of roles therein.

As a result, document processing server 50 may be configured to assign a business value rating to document 40 based, at least in part, on the combined priority scores of users associated with document 40, and/or the combined risk assessment of users associated with document 40. As one example, a CEO sends document 40 (e.g., an email message) to two vice-presidents. A CEO has been previously configured to have a priority score of 0, and a vice-president a priority score of 3. Thus, document processing server 50 may assign a business value rating to document 40 of 0+3+3, or 6. As will be appreciated, in embodiments of information management system 10 in which higher-ranked users are assigned lower priority scores, documents 40 with a lower assigned business value rating are more valuable to an enterprise than documents 40 with a higher assigned business value rating. In other embodiments in which higher-ranked users are assigned higher priority scores, documents 40 with a higher assigned business value rating are more valuable to an enterprise than documents 40 with a lower assigned business value rating. In general, depending on the needs and/or capabilities of an enterprise, business value ratings may be calculated and/or assigned in any suitable manner.

Moreover, the assigned business value rating may be a numeric value, or a relative quality. For example, low-priority documents may be assigned a priority value of "low," while high-priority documents may be assigned a priority "high." Further gradations are possible, including combinations of relative qualities and numeric values, such as "low-1," "low-2," "low-3," "high-1," "high-2," and "high-3." In general, however, the particular business value rating document processing server 50 assigns to document 40 may be customizable based on the particular needs or capabilities of an enterprise. Additionally, document processing server 50 may store the assigned business value rating in metadata associated with the particular document 40, in internal memory, or in a separate database storage device. Document processing server 50 may also discard the assigned business value rating after performing an operation with respect to document 40, discussed further below. As will be recognized by one skilled in the art, document processing server 50 may use a priority score of a user, the contents of document 40, or the characteristics associated with document 40, singly or in any appropriate combination to assign a business value rating to document 40.

Once a business value rating is assigned to document 40, document processing server 50 may additionally perform one or more operations with respect to document 40 based on the assigned business value rating. As discussed above, document processing server 50 may perform operations with respect to documents 40 that are communicated or accessed entirely within enterprise network 60, and may also perform operations with respect to document 40 that are transmitted to or received from external network 65. In this way, document processing server 50 may secure information internal to an enterprise from being "leaked" or transmitted external to the enterprise. As one example operation, document processing server 50 may store a record in an electronic database. Document processing server 50 may store document 40 itself, the business value rating assigned to document 40, a location of document 40, a time document 40 was transmitted, received, or accessed, and/or one or more users associated with document 40. For example, a user with a priority score of "2" at a particular client 30 transmits document 40 to another user at another particular client 30 within the enterprise. Based on the priority score and a predetermined configuration, document processing server 50 stores a record of document 40 in an electronic database. The electronic record may include document 40, a priority score of a user associated with document 40, a time document 40 was sent, the business value rating of document 40, the sender and recipients of document 40, and/or any other useful or relevant information pertaining to document 40. Storing a record associated with document 40 may allow for subsequent review by an administrator or manager of the transmission or access of document 40.

As another example operation, document processing server 50 may transmit a copy of document 40 to a third party. As previously discussed with respect to storing a record in an electronic database, document processing server 50 may transmit a copy of document 40 and any relevant characteristics associated with document 40 to a third party. Document processing server 50 may silently transmit a copy of document 40 and/or any relevant characteristics, such that the sender or receiver is unaware that document 40 and/or other relevant characteristics are being sent to a third party, or may displaying a warning indicator to the user, informing the user that document 40 is being sent to a third party. Transmitting document 40 to a third party may allow for immediate review by an administrator or manager of the attempted transmission or access of document 40.

As another example operation, document processing server 50 may transmit an alert. In particular embodiments, the transmission or access of certain documents 40 may be restricted and/or prohibited. Thus, when a particular user attempts to transmit or access a particular document 40, that, because of the type of document 40, the user's role within the enterprise, or a risk assessment of the user, is assigned a low business value rating (indicating a document of high value to the enterprise), document processing server 50 may generate and transmit an alert to the user. The alert may comprise displaying a visual warning on a computer display prior to or after transmitting and/or accessing document 40, generating an audible tone prior to transmitting and/or accessing document 40, or any other appropriate manner of informing a user. In addition, document processing server 50 may transmit an alert to a sender of document 40, a recipient of document 40, or a third party, such as a manager or administrator. The alert may provide information pertaining to document 40, such as the reason for the particular business value rating assigned, the particular users associated with document 40, and/or options for responding to the alert.

As another example operation, document processing server 50 may prevent the document from being sent. In circumstances in which a user within an enterprise is attempting to access transmit highly valuable documents 40 it may be preferable to prevent document 40 from being accessed or transmitted altogether. Thus, based on the assigned business value rating of document 40, document processing server 50 may be configured to prevent access to document 40, prevent transmission and/or reception of document 40, or otherwise prevent the user from performing his or her attempted operation on document 40.

As another example operation, document processing server 50 may allow document 40 to be transmitted or accessed upon approval from a third party. Analogous to situations in which it is preferable to prevent a user from transmitting and/or accessing document 40, it may also be preferable to require approval from a third party, such as a manager or supervisor, before transmitting, receiving, or accessing document 40. In such cases, document processing server 50 may transmit an appropriate alert to a third party. Document processing server 50 waits for the third party to approve or deny the attempted transmission or reception of document 40, and subsequently approves or denies the attempted transaction based on the third party's response.

Additionally, document processing server 50 may perform one or more of the operations described above based on a preconfigured policy. For example, document processing server 50 may be configured to transmit an alert to a particular client 30 if the assigned business value rating is below a threshold of 10, while document processing server 50 may be configured to prevent transmission of document 40 if the assigned business value rating is below a threshold of 5. The particular operations document processing server 50 performs with respect to document 40 at each particular business value rating may be set or customized based on the particular needs of an enterprise, or the policies an enterprise chooses to implement.

Although several operations have been provided as particular examples, document processing server 50 may not necessarily perform these particular operations, and may also perform additional operations. Additionally, as one skilled in the art will appreciate, document processing server 50 may perform operations on only a subset of documents 40 that document processing server 50 receives and/or analyzes, by, for example, randomly selecting particular documents 40, and performing operations on only the randomly selected documents 40. Moreover, the value of a business value rating assigned to a particular document 40 and the weight assigned to each factor in the determination of a business value rating may be customizable in any appropriate manner, depending on the needs or capabilities of a particular enterprise.

Given the limitations in computing power for examining all information flowing through an organization's network, and also given both the manpower required to determine and enter appropriate tags as well as the degree of expertise and lack of fuzzy tagging (e.g., the ability to equate similar keywords without requiring an exact match), the present disclosure provides a method for assigning a value to information within an enterprise. This value can be used in the creation of appropriate policies governing that information. These policies can, in turn, be used by a DLP or Information Governance product to determine if specific information can be released and under what restrictions. For example, it might be determined that high value information should not be released outside of the corporate network, and so a DLP or IG agent on a user's machine might prevent that user from emailing the information to an outside address. Additionally, it may be determined that high value information should not be accessed or transmitted within the corporate network. As a result, the system and method described in this disclosure provides an automated approach to assigning a value to information.

In general, the present disclosure provides for using corporate roles to assign a value to information. For example, as a general rule the higher the level of a particular user within an organization, the more likely it is that the user will create information that would be considered valuable, especially if it were to accidentally released to the public or provided to competitors. For example, the information created by a Senior Vice President is more likely to have competitive value to the company than information created by a Developer.

In general, the method of assigning a value to information is a combination of the role of the user who created the information, and the roles of any recipients (along with the number of recipients), where a recipient is any other user with access to the same information (e.g., through Sharepoint, by email). Accordingly, in particular embodiments, example steps in the method may include:

1) Assign a score to each role in an organization (e.g., in a corporate context this might be CEO=1, executive level=2, senior vice president=3, etc. Note that the roles would be different in a government context, or a university, etc.). Note that different roles might have the same score (e.g., a researcher might have the same score as a developer). This information can be obtained through an Identity and Access Management product.

2) Assign a score to any document based on the score of its creator (e.g., if a CEO writes a Word document, then that document has the score 1).

3) If a document is shared (e.g., an email message is sent, a Word document is placed on Sharepoint), then the score of the document is the sum of the creator and all recipients. For example, if a Word document is placed on SharePoint so that two senior vice presidents can access it, then the score of the document is 1+3+3=7. This information can be obtained through IA and entitlements.

4) The information with the lowest score is considered to have the greatest business value to the organization.

Additionally, variations on this theme can be applied. For example, if dealing with information that has been emailed, then the people listed in the "to:" line can be weighted differently than those listed in the "cc:" line.

Another example is extending this basic method to take into account specific key words. That is, this scoring method can be combined with results from DLP policies so that documents that do not contain, for example, personally identifiable information (PII) or administrator-defined keywords are scored higher than documents that do contain such information.

Another variation is that the values can be swapped, so that a CEO has a very high value rather than a very low value, etc. In this case the information with the largest score is considered to be the information with the greatest business value. In this case, however, one would need to include a weight based on the number of recipients, as the more public a piece of information (e.g., an email sent from the CEO to everyone in the company) then the less value that information is likely to have.

Additionally, while the values used here were numeric, the scores do not need to be strictly linear (e.g., CEO might have score 100, executive level score 98, and senior vice president score 87). The model could also be simplified to be qualities (e.g., high, medium, low), although these might need to be represented numerically within a computer program.

By assigning a value to information, security administrators can focus their efforts on protecting that information that is of greatest value to the company and expend less effort on that information that is of lesser value. This reduces the manpower required by an organization. Additionally, products can perform different levels of monitoring on information with different values. This reduces the computing resources required to examine all information equally. Administrators may also define different policies to govern information with different values.

Thus, by analyzing the contents and characteristics associated with document 40, and determining a priority score of a user associated with document 40, information management system 10 may assign a business value rating to document 40. Information management system 10 may use the business value rating to perform operations with respect to document 40, including storing a record of document 40, generating an alert, denying the attempted transmission or access of document 40, and requiring approval from a supervisor or manager prior to transmitting or accessing document 40. By efficiently managing documents 40 associated with heterogeneous data servers 20 and/or clients 30 within an enterprise, information management system 10 thus allows administrators to protect information that is of greatest business value to the enterprise and expend less effort on information that is of lesser business value. This may reduce the manpower required to staff information protection and analysis operations within an enterprise. Additionally, information management system 10 may analyze and process documents from various heterogeneous data servers. This may reduce substantially the amount and type of computer processing resources required to protect and analyze information within an enterprise. Moreover, a particular embodiment of information management system 10 may perform different operations with respect to documents with different business value ratings.

By selectively performing operations on documents with particular business value ratings, information management system 10 may reduce the amount of computer processing resources which would be required to examine all information and documents equally. Additionally, particular aspects of information management system 10 may be configured according to the particular needs and capabilities of a particular enterprise. Customization of information management system 10 enables administrators to flexibly and efficiently manage information within an enterprise.

As a result, information management system 10 may provide numerous operational benefits. Nonetheless, particular embodiments may provide some, none, or all of these operational benefits, and may provide additional operational benefits.

Figure 2:
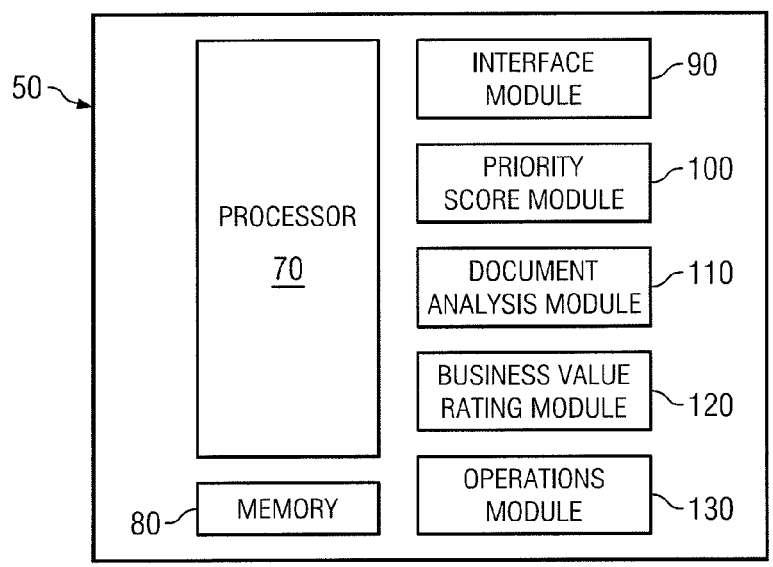
FIG. 2 is a block diagram illustrating the document processing server of FIG. 1 in more detail, including aspects of an embodiment of the present disclosure.

FIG. 2 is a block diagram illustrating in greater detail the contents and operation of a particular embodiment of document processing server 50 shown in FIG. 1. In general, as discussed above with respect to FIG. 1, document processing server 50 receives document 40, and assigns a business value rating to document 40 based on characteristics associated with document 40, the contents of document 40, and/or a priority score of a user associated with document 40. Moreover, as discussed above, document processing server 50 may represent a single component, multiple components located at a central location within information management system 10, and/or multiple components distributed throughout information management system 10. For example, document processing server 50 may represent components or modules of one or more components of enterprise network 60 or other element within information management system 10. As shown in FIG. 2, document processing server 50 may include a processor 70, a memory 80, an interface module 90, a priority score module 100, a document analysis module 110, a business value rating module 120, and an operations module 130.

Processor 70 may represent or include any form of processing component, including general purpose computers, dedicated microprocessors, or other processing devices capable of processing electronic information. Examples of processor 70 include digital signal processors (DSPs), application-specific integrated circuits (ASICs), field-programmable gate arrays (FPGAs), and any other suitable specific or general purpose processors. Although FIG. 2 illustrates a particular embodiment of document processing server 50 that includes a single processor 70, document processing server 50 may, in general, include any suitable number of processors 70. Additionally, in embodiments of information management system 10 in which document processing server 50 represents software executing on other components of information management system 10, processor 70 may represent a processor utilized in performing other operations associated with the particular component on which document processing server 50 is operating.

Memory 80 stores processor instructions and any values or parameters that document processing server 50 utilizes during operation, including, but not limited to, priority scores, and/or business value ratings of particular documents 40. Memory 80 may additionally store document 40 during the time document processing server 50 is analyzing and/or processing document 40. Memory 80 may comprise any collection and arrangement of volatile or non-volatile components suitable for storing data. For example, memory may comprise random access memory (RAM) devices, read only memory (ROM) devices, magnetic storage devices, optical storage devices, or any other suitable data storage devices. In particular embodiments, memory 80 may represent, in part, computer-readable storage media on which computer instructions and/or logic are encoded. In such embodiments, some or all the described functionality of document processing server 50 may be provided by processor 70 executing the instructions encoded on the described media. Although shown in FIG. 2 as a single component, memory 80 may represent any number of memory elements within, local to, or accessible by document processing server 50. Additionally, although shown in FIG. 2 as being located internal to document processing server 50, memory 80 may represent storage components remote from document processing server 50, such as elements at a Network Attached Storage (NAS), Storage Area Network (SAN), or any other type of remote storage component.

Interface module 90 couples document processing server 50 to appropriate components of information management system 10 to facilitate communication between document processing server 50, one or more data servers 20, clients 30, and/or other appropriate components of information management system 10. For example, document processing server 50 may receive document 40 from client 30 or data server 20 through interface module 90, or may transmit an alert to a third party, and/or transmit a record of document 40 to a database storage device through interface module 90. In particular embodiments, interface module 90 may include or represent one or more interface cards suitable for communication over enterprise network 60, or a connection to an electronic bus. Additionally, although FIG. 2 illustrates a particular embodiment of document processing server 50 that includes a single interface module 90, document processing server 50 may, in general, include any suitable number of interface modules 90.

Priority score module 100 assigns a priority score to users within an enterprise. Priority score module 100 may assign a priority score to one or more users within an enterprise at appropriate points during operation of information management system 10, including before or after document processing server 50 receives and processes document 40. As noted above, priority score module 100 may assign a priority score to a user within an enterprise based on the user's role in the enterprise. Higher-ranked users within an enterprise may receive lower priority scores than lower-ranked users. Moreover, in particular embodiments, priority score module 100 may assign lower priority scores to users that are more important within the enterprise. In other particular embodiments, priority score module 100 may assign high priority scores to users that are more important within the enterprise. Additionally, priority score module 100 may receive priority score information based on user or administrator input, or through an Identity and Access Management product and/or entitlements.

In certain embodiments, document analysis module 110 analyzes the contents of document 40, and determines characteristics associated with document 40. In particular, document analysis module 110 may be configured to electronically search document 40 for keywords, names, addresses, or any other relevant search terms or phrases. As discussed above, document processing server 50 may be configured to search for violent words, words or phrases that indicate company secrets, intellectual property, words or phrases that violate specific companies polices, such as sexual harassment or racial insensitivity, or words that indicate the name and/or address of a key competitor. In general, a user or administrator may configure document analysis module 110 to search for any relevant term or phrase, depending on the relevant factors or considerations of the enterprise.

Additionally, document analysis module 110 determines one or more characteristics associated with document 40. As discussed above, characteristics associated with a particular document 40 may include, but are not limited to, a creator of document 40, a sender of the document 40, a recipient of document 40, a quantity of recipients of document 40, an age of document 40, a size of document 40, a name of document 40, a type of document 40, and an encryption level of document 40. As noted above, depending on the particular type of document being analyzed, the one or more characteristics may be included in document 40 itself as metadata. The one or more characteristics may also be determined by document analysis module 110 independent of any metadata included in document 40. Furthermore, document processing server 50 may use the determined characteristics and/or priority score to generate and assign a business value rating to document 40.

Business value rating module 120 calculates a business value rating for document 40, based on several factors, including the contents of document 40, the characteristics of document 40, and/or the priority score of a user associated with document 40. As discussed above, a user or administrator of information management system 10 may configure business value rating module 120 to assign a business value rating based on any appropriate combination of the relevant factors, where each of the relevant factors is assigned a particular weight. The weights assigned to each factor may be customized and changed according to evolving needs and/or capabilities of a particular enterprise. For example, if a particular enterprise has reason to be particularly concerned about violence in the workplace, an administrator may assign a high weight to the contents of document 40. If a particular enterprise is concerned about emails from a CEO being widely distributed, an administrator may assign a high weight to the priority score of users. Thus, the particular business value rating assigned to document 40 by business value rating module 120 may be customizable by a user of information management system 10. As discussed above, document processing server 50 may use a priority score of a user, the contents of document 40, or the characteristics associated with document 40, alone or in any appropriate combination, and with any appropriate weight accorded to each factor, to calculate a business value rating for document 40.

Operations module 130 performs operations with respect to document 40 based on the business value rating calculated by business value rating module 120. As discussed above, in response to a business value rating that meets a threshold defined by a predetermined policy, operations module 130 may store a record in an electronic database. Operations module 130 may also transmit a copy of document 40 to a third party. Additionally, operations module 130 may transmit an alert to a sender of document 40, a recipient of document 40, or a third party, such as a manager or administrator. Operations module 130 may also prevent the document from being transmitted, or may allow document 40 to be transmitted or accessed upon approval from a third party. As noted above, operations module 130 may not necessarily perform these particular operations, and may also perform additional operations.

In general, each of processor 70, memory 80, interface module 90, priority score module 100, document analysis module 110, business value rating module 120, and operations module 130 may represent any appropriate combination of hardware and/or software suitable to perform the described functions. In particular, elements of document processing server 50 may include logic encoded on tangible, computer-readable media and executed on processor 70 and/or other computer hardware suitable to provide the described functions of document processing server 50. Additionally, any two or more of interface module 90, priority score module 100, document analysis module 110, business value rating module 120, and operations module 130 may represent or include common elements.

Figure 3:
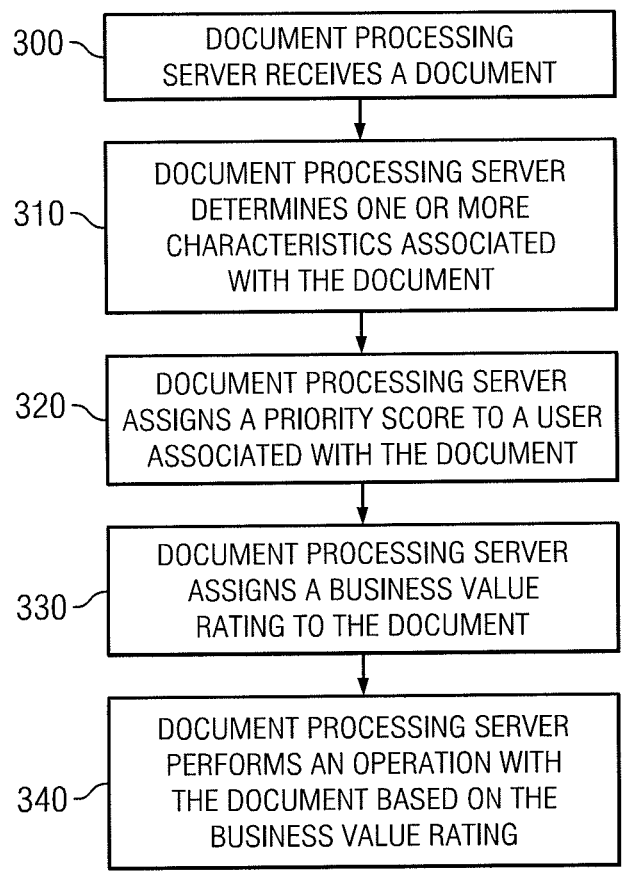
FIG. 3 is a flow chart illustrating a particular operation of the information management system of FIG. 1.

FIG. 3 is a flowchart illustrating operation of a particular embodiment of information management system 10 in assigning a business value ratings to document 40. The steps illustrated in FIG. 3 may be combined, modified, or deleted where appropriate, and additional steps may also be added to those shown. Additionally, the steps may be performed in any suitable order without departing from the scope of the present disclosure.

Operation, in the illustrated example, begins at step 300 with document processing server receiving a particular document 40. As discussed above, document processing server 50 may be appropriately placed within information management system 10, enabling document processing server 50 to intercept document 40 as it traverses enterprise network 60. In other embodiments, depending on the relevant capabilities and configurations, data server 20 and clients 30 may transmit document 40 to document processing server 50 if client 30 attempts to access document 40 on data server 20, or if data server 20 receives document 40 from client 30.

At step 310, document processing server 50 determines one or more particular characteristics associated with document 40. In particular embodiments, the characteristics may include, but are not limited to, a creator of document 40, a sender of document 40, a recipient of document 40, a quantity of recipients of document 40, an age of document 40, a size of document 40, a name of document 40, a type of document 40, and an encryption level of document 40. As noted above, the one or more characteristics may be included in document 40 itself as metadata. The one or more characteristics may also be determined by document processing server 50 independent of any metadata included in document 40.

At step 320, document processing server 50 assigns a priority score to one or more users associated with document 40. As discussed above, the priority score may be predetermined based on a user's role within the enterprise. Additionally, document processing server 50 may receive priority score information prior to or during the processing of a particular document 40. Thus, priority score information may be stored for users within an enterprise prior to the operation described in FIG. 3. Additionally, document processing server 50 may receive priority score information from a user or administrator input, or through an Identity and Access Management product and/or entitlements. As noted above, in particular embodiments of information management system 10, higher-ranked users within an enterprise may receive lower priority scores than lower-ranked users. Depending on the needs and capabilities of an enterprise, and the number and types of roles therein, the priority score and the values assigned thereto may be preconfigured and adjustable by an administrator or manager. In other particular embodiments, document processing server 50 may be configured to assign a higher priority score to higher-ranked users, and lower priority scores to lower-ranked users. High-risk users may be assigned a low priority score. Relatively low-risk users may be assigned a high priority score. In general however, particular priority scores may be set or customized based on the needs and capabilities of a particular enterprise.

At step 330, document processing server 50 assigns a business value rating to document 40. As discussed above, the business value rating may be assigned based on several factors, including the contents of document 40, the characteristics of document 40, and/or the priority score of a user associated with document 40. Additionally, the assigned business value rating may be a numeric value, or a relative quality. As discussed above, low-priority documents may be assigned a priority value of "low," and high-priority documents may be assigned a priority "high." Arbitrary numeric values may also be used, with low number indicating a high priority document 40, and high numbers indicating a lower priority document. In general, however, the particular business value rating document processing server 50 assigns to document 40 may be customizable based on the particular needs or capabilities of an enterprise. Additionally, the weight accorded each factor may be set or customized by a user or administrator of information management system 10. Document processing server 50 may store the assigned business value rating in metadata associated with the particular document 40, in internal memory, or in a separate database storage device. Document processing server may also discard the assigned business value rating after performing an operation with respect to document 40 in step 360, below.

At step 340, document processing server 50 performs an operation with respect to document 40 based on the assigned business value rating. As discussed above, document processing server 50 may perform one or more operations, depending on the particular policies implemented by an enterprise. For example, in response to a business value rating that meets a threshold defined by a predetermined policy, document processing server 50 may store a record in an electronic database, transmit a copy of document 40 to a third party, transmit an alert to a sender of document 40, a recipient of document 40, or a third party, prevent the document from being transmitted, or may allow document 40 to be transmitted or accessed in response to approval from a third party. In particular embodiments of information management system 10, document processing server 50 may perform some, none, or all of these operations, and may additionally perform additional operations with respect to document processing server 50.

Although the present disclosure has been described in connection with several embodiments, it should be understood that numerous changes, substitutions, variations, alterations, transformations, and modifications may be suggested to one of skill in the art, and it is intended that the present disclosure encompass such changes, substitutions, variations, alterations, transformations, and modifications as fall within the spirit and scope of the appended claims.

What is claimed is:

1. A method for managing information in an enterprise, comprising:
   receiving a document from a component of an enterprise network, the enterprise network comprising a plurality of heterogeneous data servers and a plurality of clients;
   determining, with a processor, one or more characteristics associated with the document, wherein the one or more characteristics are selected from the group comprising a creator of the document, a sender of the document, a receiver of the document, and a quantity of recipients of the document;
   determining, with the processor, a priority score for the document based on a respective level of risk that each user in a set of users associated with the document poses to the enterprise, each respective level of risk corresponding to each user's role in the enterprise, wherein the set of users comprises the sender of the document and the receiver of the document;
   assigning, with the processor, a business value rating to the document based, at least in part, on the one or more characteristics and the priority score; and
   performing an operation with the document based on the business value rating.

2. The method of claim 1, wherein assigning a business value rating to the document comprises assigning a business value rating to the document based, at least in part, on one or more of the characteristics and a predetermined policy.

3. The method of claim 1, further comprising:
   determining, with the processor, the contents of the document; and
   wherein assigning a business value rating to the document comprises assigning a business value rating based, at least in part, on contents of the document.

4. The method of claim 1, wherein performing an operation comprises at least one of:
   storing a record associated with the document, wherein the record includes the assigned business value rating and the one or more characteristics;
   storing the document;
   transmitting an alert based on the assigned business value rating, wherein the alert is transmitted to at least one of the sender of the document and a third party;
   preventing the document from being transmitted;
   preventing the document from being accessed on one of the plurality of heterogeneous data servers;
   transmitting the document;
   transmitting the document in response to receiving transmission approval from a third party; and
   allowing the document to be accessed on one of the plurality of heterogeneous data server in response to receiving access approval from a third party.

5. The method of claim 1, wherein the one or more characteristics are further selected from the group comprising an age of the document, a size of the document, a name of the document, a type of document, an encryption level of the document, document owner, who has access to the document, a date the document was last accessed, a date the document was created, and where the document is located.

6. A system for managing information in an enterprise, comprising:
   a processor operable to:
      receive a document from a component of an enterprise network;
      determine one or more characteristics associated with the document, wherein the one or more characteristics are selected from the group comprising a creator of the document, a sender of the document, a receiver of the document, and a quantity of recipients of the document;
      determine a priority score for the document based on a respective level of risk that each user in a set of users associated with the document poses to the enterprise, each respective level of risk corresponding to each user's role in the enterprise, wherein the set of users comprises the sender of the document and the receiver of the document;
      assign a business value rating to the document based, at least in part, on the one or more characteristics and the priority score; and
      perform an operation with the document based on the business value rating.

7. The system of claim 6, wherein the component of an enterprise network comprises:
   a plurality of heterogeneous data servers; and
   a plurality of clients in communication with at least one of the plurality of heterogeneous data servers.

8. The system of claim 6, wherein the processor is operable to assign a business value rating to the document by assigning a business value rating to the document based, at least in part, on one or more of the characteristics and a predetermined policy.

9. The system of claim 6, wherein the processor is further operable to determine the contents of the document; and
   wherein the processor is operable to assign a business value rating to the document by assigning a business value rating based, at least in part, on contents of the document.

10. The system of claim 6, wherein the processor is operable to perform an operation by performing an operation selected from the group of:
   storing a record associated with the document, wherein the record includes the assigned business value rating and the one or more characteristics;
   storing the document;
   transmitting an alert based on the assigned business value rating, wherein the alert is transmitted to at least one of the sender of the document and a third party;
   preventing the document from being transmitted;
   preventing the document from being accessed on one of the plurality of heterogeneous data servers;
   transmitting the document;
   transmitting the document in response to receiving transmission approval from a third party; and allowing the document to be accessed on one of the plurality of heterogeneous data server in response to receiving access approval from a third party.

11. The system of claim 6, wherein the one or more characteristics are further selected from the group comprising an age of the document, a size of the document, a name of the document, a type of document, an encryption level of the document, a document owner, who has access to the document, a date the document was last accessed, a date the document was created, and where the document is located.

12. A non-transitory computer readable medium encoded with logic, the logic operable, when executed on a processor, to:
   receive a document from a component of an enterprise network, the enterprise network comprising a plurality of heterogeneous data servers and a plurality of clients;
   determine one or more characteristics associated with the document, wherein the one or more characteristics are selected from the group comprising a creator of the document, a sender of the document, a receiver of the document, and a quantity of recipients of the document;
   determine, with the processor, a priority score for the document based on a respective level of risk that each user in a set of users associated with the document poses to an enterprise, each respective level of risk corresponding to each user's role in the enterprise, wherein the set of users comprises the sender of the document and the receiver of the document;
   assign, with the processor, a business value rating to the document based, at least in part, on the one or more characteristics and the priority score; and
   perform an operation with the document based on the business value rating.

13. The non-transitory computer readable medium of claim 12, wherein the logic is operable to assign a business value rating to the document by assigning a business value rating to the document based, at least in part, on one or more of the characteristics and a predetermined policy.

14. The non-transitory computer readable medium of claim 12, wherein the logic is further operable to determine the contents of the document; and
   wherein the logic is operable to assign a business value rating to the document by assigning a business value rating based, at least in part, on contents of the document.

15. The non-transitory computer readable medium of claim 12, wherein the logic is operable to perform an operation by performing an operation selected from the group of:
   storing a record associated with the document, wherein the record includes the assigned business value rating and the one or more characteristics;
   storing the document;
   transmitting an alert based on the assigned business value rating, wherein the alert is transmitted to at least one of the sender of the document and a third party;
   preventing the document from being transmitted;
   preventing the document from being accessed on one of the plurality of heterogeneous data servers;
   transmitting the document;
   transmitting the document in response to receiving transmission approval from a third party; and
   allowing the document to be accessed on one of the plurality of heterogeneous data server in response to receiving access approval from a third party.

16. The non-transitory computer readable medium of claim 12, wherein the one or more characteristics are further selected from the group comprising an age of the document, a size of the document, a name of the document, a type of document, an encryption level of the document, a document owner, who has access to the document, a date the document was last accessed, a date the document was created, and where the document is located.

17. A system for managing information in an enterprise, comprising:
   means for receiving a document from a component of an enterprise network, the enterprise network comprising a plurality of heterogeneous data servers and a plurality of clients;
   means for determining, with a processor, one or more characteristics associated with the document, wherein the characteristics are selected from the group comprising a creator of the document, a sender of the document, a receiver of the document, and a quantity of recipients of the document;
   means for determining, with the processor, a priority score for the document based on a respective level of risk that each user in a set of users associated with the document poses to the enterprise, each respective level of risk corresponding to each user's role in the enterprise, wherein the set of users comprises the sender of the document and the receiver of the document;
   means for assigning, with the processor, a business value rating to the document based, at least in part, on the one or more characteristics and the priority score; and
means for performing an operation with the document based on the business value rating.

* * * * *